PROCESS FOR THE PREPARATION OF A BORON TRIHALIDE

Jawad H. Murib, St. Bernard, and Irving L. Mador, Cincinnati, Ohio, assignors to National Distillers and Chemical Corporation, New York, N.Y., a corporation of Virginia
No Drawing. Filed Nov. 14, 1960, Ser. No. 68,623
6 Claims. (Cl. 23—205)

The present invention relates to a novel method for preparation of boron trihalides and boron hydrides. More particularly, the invention relates to the synthesis of boron trichloride, dichloroborane and diborane by direct reaction of an oxygen-containing boron compound, such as boric oxide, metal borates, or alkylborates with a hydrogen halide, such as hydrogen chloride, hydrogen bromide, hydrogen iodide, etc. in the presence of carbon.

In accordance with the process of this invention, which may be shown by the following equations:

(1) $B_2O_3 + 6HCl + 3C \rightleftharpoons 2BCl_3 + 3CO + 3H_2$
(2) $BCl_3 + H_2 \rightleftharpoons BHCl_2 + HCl$ the oxygen-containing boron compound is subjected to contact with a hydrogen halide and carbon at an elevated temperature whereby there is produced a boron trihalide or dihaloborane, or a mixture thereof.

The course of the reaction is controlled by a number of conditions, including temperature, pressure, relative quantities of reactants, residence time, and rate of quench. The free energies involved in reaction (1) are such that the reaction is driven further to the right (that is, to produce $BCl_3$) with increasing temperature of reaction. The preferred temperature of operation is between 900° C. and 1400° C. Equilibrium and rate considerations indicate a temperature over 900° C. is desirable. Above 1400° C., problems in materials of construction become very serious, and furthermore, undesirable by-products may be produced.

The reaction may be carried out at subatmospheric, atmospheric or superatmospheric pressure, although the degree of conversion and the types of product obtained are affected accordingly. In general, a pressure of approximately 1 to 10 atmospheres is preferred compared to higher pressures which result in reduced conversions. By controlling the partial pressure of hydrogen halide in the reaction it is possible to control the relative amounts of boron trihalide and dihaloborane obtained. The partial pressure of hydrogen halide may be controlled by the residence time in the reaction zone. When the residence time is short (0.01 to 1.0 second) less of the hydrogen halide is transformed and it is present in greater relative amounts in the reaction gases. Thereby, essentially pure boron trihalides are obtained. At lower pressures of hydrogen halide, secured by employing larger residence times (1.0 to 60 seconds or more) dihaloborane is produced together with boron trihalide. Residence times of 0.1 to 10 seconds are preferred.

The feed pressures of hydrogen halide may also be varied to control the relative amounts of boron trihalide and dihaloborane that are formed. By employing high pressures of hydrogen halide the amounts of dihaloborane are reduced to essentially negligible amounts. At lower pressures of hydrogen halide larger quantities of dihaloborane may be obtained. Therefore, both residence times and pressure may be employed to control the amounts of products to be obtained. The pressures at which the reactor may be operated may vary from subatmospheric to many atmospheres of pressure, but as a matter of convenience it is preferred to operate between about 1 atmosphere and 10 atmospheres of hydrogen halide pressure.

For the reaction involved herein, and in which the carbon is in the reactor as a solid phase in admixture with the oxygen-containing boron compound, the amount of carbon should be present at least in an amount equivalent to the oxygen contained in the boron compound, atom for atom. However, an excess of carbon may be used without deleterious effect, and in fact, is frequently employed in order to make a good contacting and reactive bed with the boron compound. It also helps in premixing the oxygen-containing compound with the carbon to form a uniform mixture. When employing an alkyl borate as the oxygen-containing boron reactant, the carbon contained in the compound (e.g., alkyl borate) is already present in sufficient amount or in excess, depending on which alkyl group is present. When an alkyl borate is used, it is found that more hydrogen is present than is desirable, and the excess of hydrogen tends to drive the reaction of Equation 1 to the left (that is, to the starting materials) and it ends to produce the dihaloborane as in Equation 2. This can be prevented by having solid carbon present in the reactor at the same time, thereby reducing the H/C ratio.

In order to have a totally gas phase reaction and to avoid having to introduce a solid phase into the hot reactor, it is convenient to introduce the oxygen-boron compound in the form of a trihaloboroxine which is volatile. Such compounds are obtained, for example, by heating boron oxide in the presence of a boron trihalide at 250–500° C., as in the following equation:

$$BCl_3 + B_2O_3 \rightarrow B_3O_3Cl_3$$

Thus, boron trihalide is contacted with boron oxide at a temperature of 250–500° C. in a continuous flow system. The hot trihaloboroxine gas is mixed with appropriate amounts of hydrogen halide and passed into the main reactor to contact carbon therein.

When the gases pass out of the reactor and begin to cool the equilibria shown in Equations 1 and 2 shift toward the left. However, by rapid cooling, equilibrium is frozen because at low temperatures the rate of back-reaction is extremely slow. The degree of overall conversion, therefore, depends on how fast the reaction gases are cooled. If the gases are cooled to 300° C. within about one second or less, for example, essentially no decrease in conversion occurs. In general, the more rapid the quench, the better.

The products of the reaction are boron trihalide or boron trihalide plus dihaloborane, hydrogen, carbon monoxide and frequently excess hydrogen chloride. The products can be separated from each other and obtained in their pure states by any of several different processes, or combinations thereof, such as fractional distillation, absorption or adsorption. One of such suitable methods involves fractional condensation, when hydrogen chloride is used as the hydrogen halide reactant, and in which the reaction product gases are cooled and passed through a series of traps, the first of which is cooled to −78° C. to condense out most of the $BCl_3$ and part of the $BHCl_2$ (if any is present). The second trap is cooled to −120° C. and separates out the remainder of the $BCl_3$ and $BHCl_2$. The next trap is cooled to −196° C. and condenses the hydrogen chloride. The hydrogen and carbon monoxide are not condensed and pass through the traps. The hydrogen chloride can thus be recycled to the reactor. The boron trichloride, if the reaction was conducted without forming $BHCl_2$, is thus obtained directly. If $BHCl_2$ is present, the mixture of $BCl_3$ and $BHCl_2$ can be refluxed in a fractionating column until the $BHCl_2$ has been converted completely to diborane and $BCl_3$ according to the following reaction:

$$6BHCl_2 \rightleftharpoons 4BCl_3 + B_2H_6$$

The reaction goes to completion because the diborane, being extremely volatile, is removed as it is formed. Thereby, the pure diborane is obtained, as well as pure $BCl_3$.

In order to further describe the invention, the following embodiment thereof is set forth for purposes of illustration and not limitation.

*Example*

34.8 parts by weight of 99% $B_2O_3$, 36.0 parts of carbon, and 2.0 parts of sugar were ground together with a mortar and pestle to a fine powder. Enough water was mixed with the powder to make a paste. The paste was spread in a ⅛ inch layer over a glass tray and sectioned into ⅛ x ⅛ inch squares, then baked for 48 hours at 120° C. About 10 to 15 grams of the resulting dried pellets were packed into a quartz tube of 1 inch diameter, and dehydrated by heating the tube in a globar furnace for about 16 hours at 850–900° C. while maintaining an argon sweep. The temperature was then raised to about 1300° C., and the argon stream replaced by a stream of dry hydrogen chloride, passed over the pellets at a rate of about 200 cm.³/sec. The effluent gases were passed successively through cold traps at −78° C. and −112° C., and mercury and water bubblers. During the first 3 to 4 minutes of reaction time, a light brown deposit appeared at the exit end of the reaction tube, which later was covered by a white deposit. The reaction was continued for a total of 6 to 7 minutes. The contents of the two cold traps (condensate and vapor phase) were transferred to an evacuated tube. Analysis of a sample of this mixture by infrared and mass spectroscopy showed the presence of $BCl_3$, $BHCl_2$, $CO$, $H_2$, and $HCl$. Phosgene ($COCl_2$) was not detected. Fractional condensation of the mixture in a train of U-tubes maintained at −80° C., −112° C., and −196° C. successively, resulted in the isolation of a colorless liquid as the −112° C. fraction. This liquid exhibited vapor pressure of 4 mm. and 50.5 mm. at −78.5° C. and −45° C. respectively, i.e., values identical to those of pure $BCl_3$.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for the preparation of a boron trihalide which comprises reacting, at an elevated temperature within the range of about 900° to 1400° C. and a pressure of about from 1 to 10 atmospheres, an oxygen-containing boron compound, wherein the boron atom is directly linked to an oxygen atom, selected from the group consisting of boron oxide, metal borates, alkyl borates and trihaloboroxine with a hydrogen halide in the presence of carbon.

2. The process of claim 1 wherein said reaction is carried out for from about 0.01 to about 60 seconds.

3. The process of claim 1 wherein the reaction is carried out in the presence of carbon in an amount of at least about one atom of carbon per atom of oxygen in the oxygen-containing boron compound.

4. The process of claim 1 wherein said oxygen-containing boron compound is boron oxide and hydrogen halide is hydrogen chloride.

5. The process of claim 1 wherein the resulting gaseous product mixture of the reaction is rapidly quenched.

6. A process for the preparation of boron trichloride which comprises reacting, at an elevated temperature within the range of about 900° to 1400° C. and a pressure of from about 1 to 10 atmospheres, boron oxide, carbon and hydrogen chloride, and then rapidly quenching the resulting reaction product mixture.

References Cited in the file of this patent

UNITED STATES PATENTS

| | | |
|---|---|---|
| 2,901,322 | Sprouse et al. | Aug. 25, 1959 |
| 2,954,274 | Walsh | Sept. 27, 1960 |
| 3,000,705 | Juckniess | Sept. 19, 1961 |
| 3,095,271 | McIntyre et al. | June 25, 1963 |

OTHER REFERENCES

Nickles: "Comptes Rendus," vol. 60. pp. 800–803 (1865).